(No Model.)

F. C. CALDWELL.
SCREW CONVEYER.

No. 295,731. Patented Mar. 25, 1884.

Attest:
Charles Pickle
Geo. L. Wheelock

Inventor:
Frank C. Caldwell
By Knight Bros
Attys

UNITED STATES PATENT OFFICE.

FRANK C. CALDWELL, OF CHICAGO, ILLINOIS.

SCREW-CONVEYER.

SPECIFICATION forming part of Letters Patent No. 295,731, dated March 25, 1884.

Application filed September 4, 1883. (No model.)

*To all whom it may concern:*

Be it known that I, FRANK C. CALDWELL, of Chicago, in the county of Cook and State of Illinois, have invented a certain new and useful Improvement in Screw-Conveyers, of which the following is a full, clear, and exact description, reference being had to the accompanying drawings, forming part of this specification, and in which—

Figure 1:
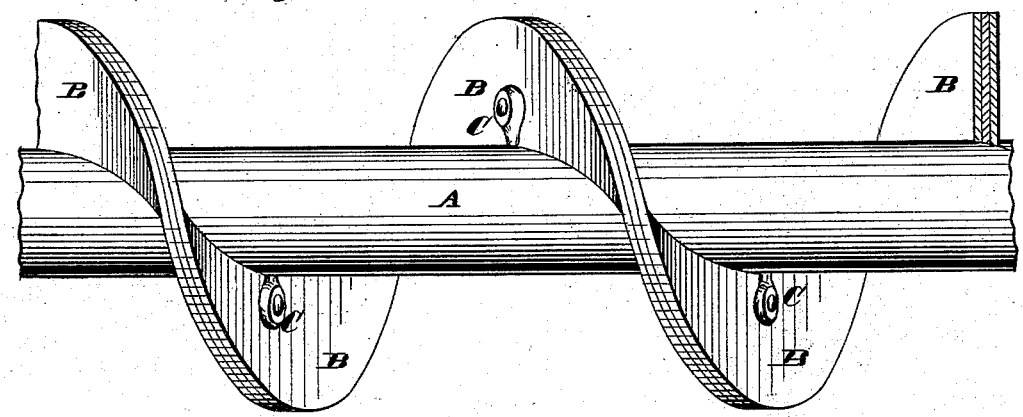
Figure 2:
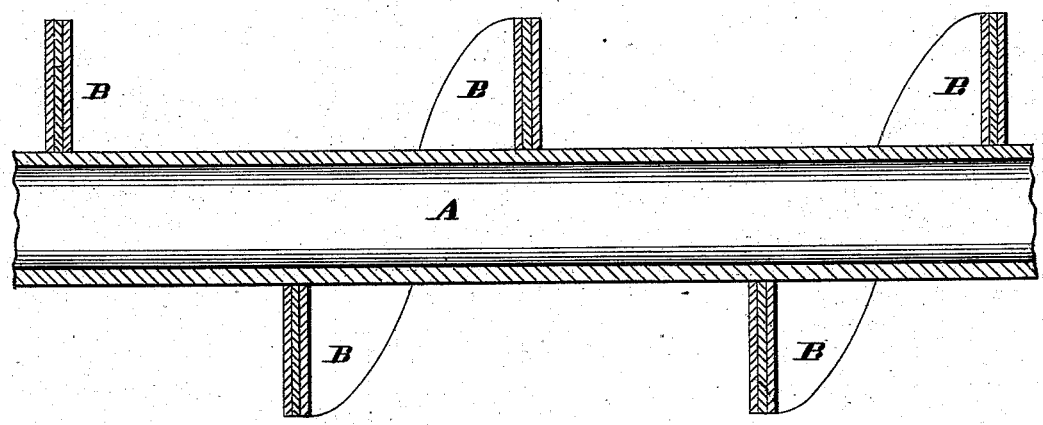

Figure 1 is an elevation, and Fig. 2 a longitudinal section.

My invention is more especially intended for use on flour-conveyers, but may be used for other purposes to which it may be suited.

My invention relates to the flights of screw-conveyers; and it consists in making them of a multiple or plurality of veneers, properly formed and cemented or secured together and to the shaft, as more fully described hereinafter.

Referring to the drawings, A represents the shaft of the conveyer, and B the flights. I prefer to use the hollow shaft shown and described in various patents granted to Henry W. Caldwell, and have shown the same, but do not confine myself to any form or shape of shafting. The flights B consist of a plurality of veneers, preferably placed so that the grain of the different layers will be crossed. I have shown three layers; but any desired number may be used and of any desired thickness each. They are secured together by suitable cement or other means, and the preferred manner of shaping them would be to place them in a mold under pressure, during which time, if cemented or glued, they would adhere together, and after being removed from the mold would be placed upon the shaft, and the ends of the different sections (which would be of any desired length, preferably each one surrounding the shaft once or a little more than once, as set forth and claimed in one of the patents granted to the said Henry W. Caldwell) secured together, and the whole secured to the shaft by any desirable form of fastening, as at C, Fig. 1.

A conveyer-flight thus formed is rigid, light, cheap, and sufficiently durable for dry purposes, such as flour, &c.

I claim as my invention—

1. A conveyer-flight formed of a plurality of veneers, as set forth.

2. A conveyer-flight formed of a plurality of veneers secured together and to the shaft, substantially as set forth.

3. In a conveyer, the combination of the shaft and the continuous flight, the latter being formed of a plurality of veneers, which are secured together and to the shaft, substantially as shown and described.

FRANK C. CALDWELL.

In presence of—
GEO. W. SICKELS,
JULIUS H. SMITH.